Sept. 7, 1937.    L. H. MORRISON    2,092,221
APPARATUS FOR TREATMENT OF FLUIDS
Filed April 18, 1935
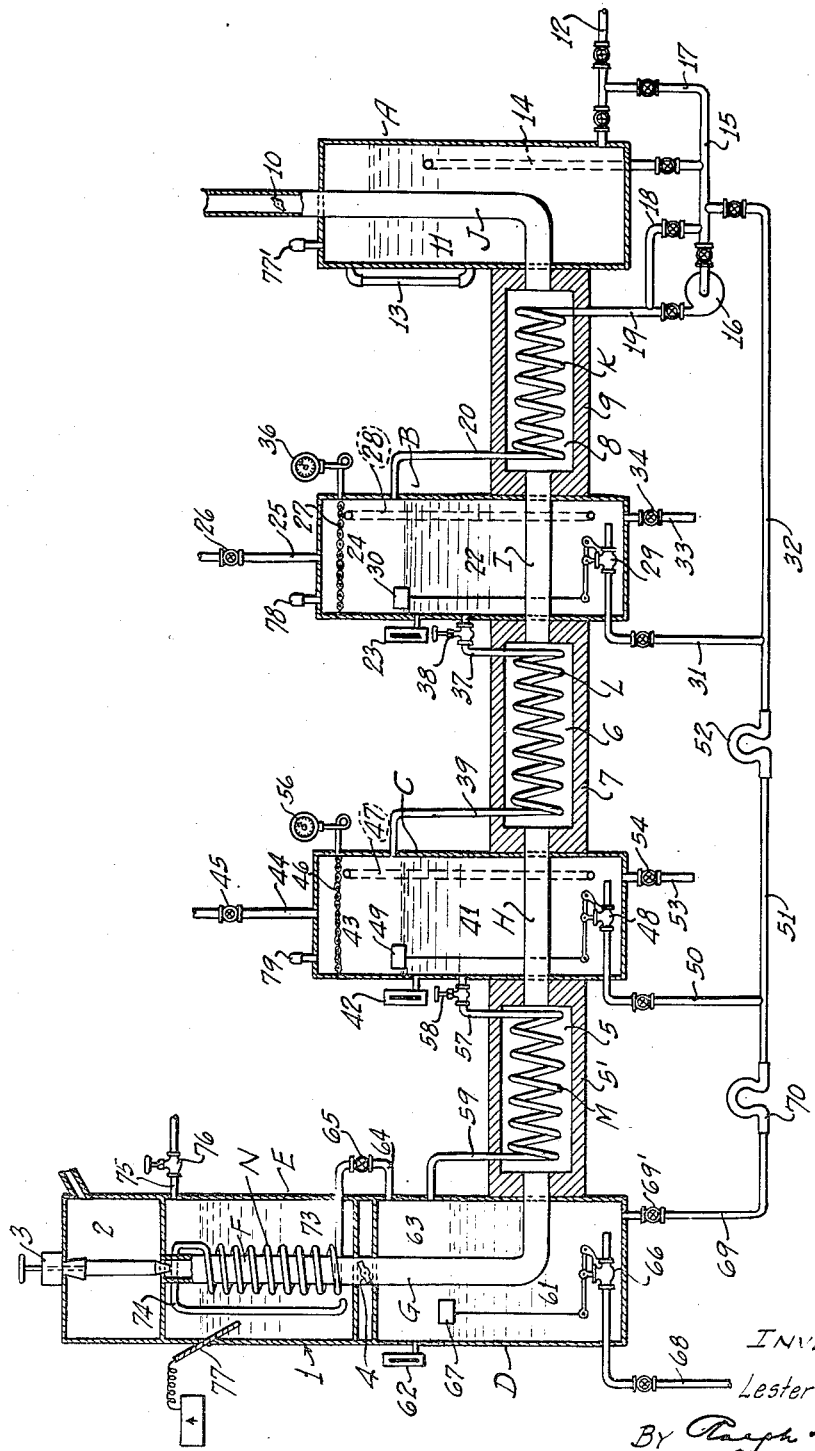
INVENTOR
Lester H. Morrison.
By Ralph ......
ATTORNEY Patented Sept. 7, 1937

2,092,221

UNITED STATES PATENT OFFICE 2,092,221

APPARATUS FOR TREATMENT OF FLUIDS

Lester H. Morrison, St. Louis, Mo.

Application April 18, 1935, Serial No. 17,071

9 Claims. (Cl. 257—242)

This invention relates to an apparatus for treatment of liquids, vapors, emulsions, and gases.

My invention has for its prime object and resides in the provision of an efficient, readily constructed apparatus for the economical distillation, clarification, fractionation, and other beneficial treatment of liquids, vapors, emulsions, and gases, the apparatus involving a system of stage heating without separation of fluid-constituents, with interstage separation of fluid-constituents, the separation being effected in chambers operating at successively higher temperatures and successively lower pressures together with countercurrent heat-exchange.

The accompanying drawing is a diagrammatic representation of an apparatus comprising a preferred embodiment of my invention.

Referring now more in detail and by reference characters to the drawing, the apparatus includes a series of treating chambers comprising in the present instance a preheating chamber or stock-tank A, a first separating chamber B, a second separating chamber C, a third separating chamber D, and a lead-still E.

Preferably the chambers D and still E are combined in a common structure or tower I, in the top of which is a wind-box 2, through which, as shown, extends a burner-equipped combustible fuel-supply line 3, the resulting products of combustion providing the heating medium or fluid for the apparatus.

From the combustion chamber 2, a fire-tube or heat conduit F leads vertically downwardly through the chamber or still E, a suitable damper 4 being preferably provided at the end of the conduit F between the chambers E and D. From the conduit F, a conduit G extends also downwardly through a portion of the chamber D and emerges from a side of the chamber D into an expanded passage or flue 5 disposed between the chambers D and C. Preferably, as shown, the walls 5' of the flue 5 are formed of suitable insulating material.

Extending through the chamber C and communicating at its one end with the flue 5 and at its other end with a flue 6 disposed between the chambers C and B, is a conduit H, the walls 7 of the flue 6 being likewise formed of insulating material.

Similarly, a heat conduit I extends through the chamber B and communicates at its one end with the flue 6 and at its other end with a flue 8, the latter being disposed between the chambers B and A and the wall 9 thereof being formed of insulating material.

From the flue 8, a conduit J extends, as shown, through the chamber A, a suitable damper 10 being preferably provided in the conduit J where it emerges from the chamber A for controlling the flow of effluent gases and the conduit J being connected in any suitable manner with a stack or the like, not shown.

The stock 11 to be treated is fed to the lower portion of the chamber A through a supply pipe 12, the level of the stock 11 in the chamber A being indicated by a gauge-glass 13. The stock 11 in the chamber A is preheated by the conduit J, and the warmed stock 11 is discharged from the chamber A through a pipe 14 to the suction line 15 of a suitable type of pump 16, a bypass line 17 being provided for feeding cold stock directly from the supply pipe 12 to the suction pipe 15 of the pump 16, if desired. A bypass 18 also extends from the suction pipe 15 to the discharge pipe 19 of the pump 16.

The discharge line 19 of the pump 16 leads to one or the cooler end of a heat-exchanger or coil K disposed in the flue 8, the pumped stock 11 flowing through the coil K in a direction countercurrent to the flow of heating fluid or other medium in the flue 8.

The heated material 11 from the coil K is fed through a pipe 20 into the upper portion of the chamber B, the pipe 20 preferably entering the chamber B substantially above the level of the liquid 22 therein.

A suitable temperature, as indicated by a thermometer 23, is maintained in the chamber B by means of the heat-conduit I, whereby a portion of the incoming material 11 is vaporized and the resulting vapor fraction 24 withdrawn, if desired, from the upper portion of the chamber B through a pipe 25 and relief valve 26, a suitable strainer 27 being provided in the chamber B, if desired.

The liquid fraction 22 of the material in the chamber B is maintained at the desired level, as shown by a gauge-glass 28, by means of an automatic valve 29 operable by a float 30 for discharging the excess of the liquid 22 from the chamber B through a pipe 31 into a recirculating line 32, which leads back to the suction line 15 of the pump 16. A blow-off line 33 controlled by a valve 34 leads from the bottom of the chamber B for removal of sediment or sludge which may accumulate therein.

Normally, sufficient pressure, as indicated by a pressure gauge 36, is also maintained in the chamber B to force the liquid 22 through the remainder of the apparatus, the liquid fraction 22 being discharged from the central portion of the chamber B through a pipe 37 and a suitable check or regulating valve 38, actuable for preventing reverse flow of liquid in the pipe 37, into one or the cooler end of a heat-exchanger or coil L disposed in the flue 6 and flowing through the coil L in a direction counter-current to the flow of heating gases in the flue 6.

The heated material 22 from the coil L is fed through a pipe 39 into the upper portion of the chamber C, the pipe 39 preferably entering the chamber C substantially above the level of the liquid 41 therein.

A suitable temperature, as indicated by a thermometer 42, is likewise maintained in the chamber C by means of the heat-conduit H, whereby a portion of the incoming material 22 is vaporized and the resulting vapor-fraction 43 withdrawn, if desired from the upper portion of the chamber C through a pipe 44 and pressure-regulating or relief valve 45, a suitable strainer 46 being provided in the chamber C, if desired.

The liquid fraction 41 of the material in the chamber C is maintained at the desired level, as shown by a gauge-glass 47, by means of an automatic valve 48 operable by a float 49 for discharging the excess of the liquid 41 from the chamber C through a pipe 50 into a recirculating line 51, which, in turn, through an expansion connection 52, communicates with the pipe 32. A blow-off line 53, controlled by a valve 54, leads from the bottom of the chamber C for removal of sediment or sludge which may accumulate therein.

Normally, sufficient pressure, as indicated by a pressure gauge 56, is likewise maintained in the chamber C to assist in forcing the liquid 41 through the remainder of the apparatus, the liquid fraction 41 being discharged from the central portion of the chamber C through a pipe 57 and a suitable check or regulating valve 58 into one or the cooler end of a heat-exchanger or coil M disposed in the flue 5 similarly flowing through the coil M in a direction counter-current to the flow of heating-gases in the flue 5, the valve 58 preventing reverse flow and regulating pressure in the pipe 57.

The heated material 41 from the coil M is fed through a pipe 59 into the upper portion of the chamber D, the pipe 59 preferably entering the chamber D substantially above the level of the liquid 61 therein.

A suitable temperature, as indicated by a thermometer 62, is also maintained in the chamber D by means of the heat-conduit G, whereby most of the incoming material is vaporized, the resulting vapor-fraction 63 being withdrawn through a pipe 64 controlled by a regulating valve 65.

The liquid fraction or residue 61 of the material in the chamber D is maintained at the desired level by means of an automatic valve 66 operable by a float 67 for discharging the residue 61 suitably from the chamber D through a pipe 68. A blow-off line 69, controlled by a valve 69', communicates through a flexible connection 70 with the pipe 51, whereby the residue 61 may, if desired, be returned to the pump-suction line 15.

Normally, sufficient pressure is suitably maintained in the chamber D to force the vapors 63 through the balance of the apparatus, the vapors 63 passing through the pipe 64 into a heat-exchanger or coil N which is wrapped around a portion of the heat-conduit F in the chamber E. The chamber E is suitably filled with liquid lead or other appropriate alloy 73, which is maintained in its molten state by means of the heat-conduit F, and, the coil N being likewise immersed in the liquid lead 73, the material flowing through the coil N is heated both by the conduit F and the liquid lead 73, the vapor 63 entering the coil N at its lowest point and leaving the coil N at its highest point, so that the flow of material through the coil N is counter-current to the flow of heating-medium in the conduit F.

From the upper end of the coil N, the heated vapor 63 is discharged into a continuation in the form of a pipe 74, which extends downwardly into the lead-bath 73 substantially to the bottom of, and preferably at a tangent to, the chamber E into which the pipe 74 discharges the vapors 63; the vapors 63 thence bubbling upwardly through the lead-bath 73 and discharging from the upper portion of the chamber E through a pipe 75 provided with a regulating valve 76.

The lead-bath 73 is, by means of the heat-conduit F, maintained at a suitable temperature, as indicated by an immersion pyrometer 77, for effecting the desired chemical reactions in the vapors 63 during their passage through the lead-bath 73, as will more particularly hereinafter appear.

In the operation and use of the apparatus, briefly, it may be said that the apparatus comprises a series of treating chambers having a rising temperature gradient and a falling pressure gradient with heat-exchangers between successive treating chambers, and a series of heat conduits each leading through a treating chamber and connecting the successive heat-exchangers in a series through which the heating medium and the material being heated flow in counter-current.

In this manner, an economy of heating medium or fluid is effected, since the heating medium or fluid in its hottest state is supplied to the hottest chamber, and the heating fluid in its coolest state is supplied to the coolest chamber.

In the heat-exchangers, the material to be treated is subjected to a high velocity for preventing accumulation of sediment, while in the treating chambers, the material is subjected to a low velocity for effecting clarification of the material by settling of the sediment, the heat conduits in the treating chambers being provided for maintaining the material in the chamber at its effluent temperature from the preceding heat-exchanger.

As a result, the reduced pressure in each chamber relatively to the pressure in its preceding heat-exchanger effects the vaporization of a fraction of the material, which fractionation may be made use of in any suitable manner, as may best serve the desired purpose.

In one use of my invention, the apparatus may be employed as an oil-cracking still for cracking emulsified crude oil. In such case, the oil emulsion is preheated in the chamber A and then heated in the coil K and passed to the chamber B, in which there is maintained a temperature of approximately 180° F.

The light gasoline vapor-fractions which are separated in the chamber B are drawn off through the pipe 25, and sent to a fractionating tower, blending tank, or the like, while the free water in the emulsion is settled out and drawn off through the pipe 33.

The liquid fraction is then heated in the coil L and passed to the chamber C, in which there is maintained a suitable pressure and a temperature of approximately 350° F.

In the chamber C, the water which is combined in any way with the oil is turned to steam, and the heavy gasoline vapor-fractions which are separated in the chamber C, together with the steam, are withdrawn through the pipe 44 and sent to other treating apparatus as desired.

From the chamber C, the liquid fraction is passed through the coil M to the chamber D, in which is also maintained a suitable pressure and a temperature of approximately 650° F.

In the chamber D, the oils are vaporized and are passed out through the pipe 64 into the coil N of the still E, while the tarry residue is discharged through the pipe 68.

The vaporized oils are then heated in the coil N and pass through the pipe 74 to the bottom of the lead-bath 73, which is maintained at a temperature of approximately 800° F. to 1000° F., the pressure in the chamber of the still E being suitable for operation purposes. The hydrocarbon vapors bubbling up through the lead-bath 73 are "cracked", that is to say, are reduced from higher boiling compounds to lower boiling compounds in the manner well known to those skilled in the art, and the cracked vapors are withdrawn from the still E through the pipe 75 and sent to a fractionating tower, blending tank, or condenser, as may best serve the purpose.

In another use of my invention, the apparatus may be employed as a water treater and steam generator. In such use, the water is preheated in the chamber A and then passed by the feed-pump 16 through the coil K to the chamber B at a temperature of approximately 212° F. to 250° F. and at a pressure sufficiently high to force the water through the remainder of the apparatus.

Most of the scale forming substances are settled out of the water in the chamber B, the sludge being withdrawn at suitable intervals through the blow-off pipe 33.

From the chamber B, the water is passed through the coil L to the chamber C at a temperature of approximately 300° F., where many other impurities may be settled out of the water and withdrawn through the blow-off pipe 53. Also steam for process use may be withdrawn from the chamber C through the pipe 44.

The level of the water in the chamber C is maintained substantially below the outlet pipe 57, so that the vapor fraction or steam in the chamber C is withdrawn therefrom and superheated in the coil M, the superheated steam then passing to the chamber D and thence through the pipe 64 to the apparatus for which it was generated.

If any steam is condensed in the chamber D, the condensate may be returned through the pipe 69 to the feed-pump 16, and any accumulated sludge may be withdrawn through the pipe 68.

Preferably, when employed for steam generation, the chambers A, B, and C, are equipped with safety valves 77', 78, 79, respectively, the chamber E being omitted, as will be understood.

The length of the several heat-conduits is proportioned in consideration of the kind and volume of stock to be passed through the apparatus, the heat absorption required in each stage or conduit, and the volume and temperature of the heating gases supplied for heating the conduits.

It will be seen that by my invention, I provide an apparatus for stage heating with interstage separating chambers operating at successively higher temperatures and successively lower pressures for the economical treatment of liquids, emulsions, vapors, and gases. And it will be understood that the several temperatures and pressures herein quoted are for illustrative purposes only, and I do not wish to be limited to such operative conditions in the practical application of my invention.

It will be further understood that changes and modifications in the form, construction, arrangement, and combination of the several parts of my treating apparatus may be made and substituted for those herein shown and described without departing from the nature and principle of my invention.

Having thus described my invention, what I claim and desire to secure by Letters Patent is,—

1. Apparatus for treating fluids comprising, in combination, a plurality of separate chambers each having a vapor outlet, pipe-sections for connecting said chambers for flow of fluid being treated from one chamber to the other, a conduit having first sections disposed between, and second communicating sections extending through, said chambers, and means for directing a heating medium through said conduit, said pipe-sections having portions disposed within said first conduit-sections for subjection to the heating medium flowing therein.

2. Apparatus for treating fluids comprising, in combination, a plurality of separate chambers each having a vapor outlet, pipe-sections for connecting said chambers for flow of fluid being treated from one chamber to the other, a conduit having first sections disposed between, and second communicating sections extending through, said chambers, and means for directing a heating medium through said conduit, said pipe-sections having coiled portions lengthwise disposed within said first conduit sections for subjection to the heating medium flowing therein.

3. Apparatus for treating fluids comprising, in combination, a plurality of separate chambers each having a vapor outlet, pipe-sections for connecting said chambers for flow of fluid being treated from one chamber to the other, a conduit having first sections disposed between, and second communicating sections extending through, said chambers, means for directing a heating medium through said conduit, said pipe-sections having coiled portions lengthwise disposed within said first conduit sections for subjection to the heating medium flowing therein, and means for causing the fluid being treated to flow in a direction counter to the direction of flow of the heating medium.

4. Apparatus for treating fluids comprising, in combination, a plurality of separate chambers each having a vapor outlet, pipe-sections for connecting said chambers for flow of fluid being treated from one chamber to the other, a conduit having first sections disposed between, and second communicating sections extending through, said chambers, means for maintaining normal fluid level in the respective chambers, means for directing a heating medium through said conduit, said pipe-sections being partially disposed within said first conduit-sections for subjection to the heating medium flowing therein and discharging into the respective chambers above the normal fluid level therein, and means for causing the fluid being treated to flow in a direction counter to the direction of flow of the heating medium.

5. Apparatus for treating fluids comprising, in combination, a plurality of separate chambers each having a vapor outlet, pipe-sections for connecting said chambers for flow of fluid being treated from one chamber to the other, a conduit having first sections disposed between, and second communicating sections extending through, said chambers, means for maintaining normal fluid level in the respective chambers, means for directing a heating medium through said conduit, said pipe-sections being partially disposed within said first conduit-sections for subjection to the heating medium flowing therein and said respective pipe-sections receiving fluid from one chamber at a point intermediate the normal fluid level and the bottom of the chamber and discharging into another chamber above the normal fluid level therein, and means for causing the fluid being treated to flow in a direction counter to the direction of flow of the heating medium.

6. Apparatus for treating a fluid having heat-separable constituents comprising, in combination, a preheater chamber, a first separate fractionating chamber, a second separate fractionating chamber, a separate vaporizing chamber, a lead-still, a conduit for a heating-medium extending successively through the still and all the chambers, pipe-sections for connecting the several chambers for flow of fluid being treated from one chamber to the other, said pipe-sections being partially disposed within said conduit for subjection to the heating fluid flowing therein, a heat-exchanger enveloping the conduit in the lead-still in communication both with the still and the vaporizing chamber, means for causing flow of fluid from the preheating chamber successively through the respective chambers, the pipe-sections, and the still, and means for causing flow of heating-medium in the conduit counter-current to the flow of fluid being treated.

7. Apparatus for treating a fluid comprising, in combination, a still, means comprising a chamber and a heat-conduit extending into the chamber and vertically through the still for vaporizing the fluid, and a vapor-pipe having communication with said chamber and spirally enveloping the conduit within the still, said pipe having an extension projecting downwardly into the still and through the bath thereof for discharge of the vapor into the bath adjacent the bottom of the still.

8. Apparatus for treating a fluid comprising, in combination, a vaporizing chamber, a still superposed over the chamber, a heat-conduit extending through the still and downwardly into the chamber, and a vapor-pipe leading from the chamber into the still adjacent the bottom thereof and spirally extending upwardly in the still about the conduit, said pipe having an extension projecting downwardly into the still and through the bath thereof for discharge of the vapor into the bath adjacent the bottom of the still.

9. Apparatus for treating a fluid comprising, in combination, a vaporizing chamber, a still superposed over the chamber, a heat-conduit extending through the still and downwardly into the chamber, and a vapor-pipe leading from the chamber into the still adjacent the bottom thereof and spirally extending upwardly in the still about the conduit, said pipe having an extension projecting downwardly into the still and through the bath thereof for discharge of the vapor into the bath adjacent the bottom of, and at a tangent to, the still.

LESTER H. MORRISON.